Aug. 27, 1929.                G. SPIESS                1,725,837
                         CROSS FOLDING MACHINE
                          Filed Feb. 4, 1927          7 Sheets-Sheet 1

Inventor: Georg Spiess
By: [signature]
   Attorney

Aug. 27, 1929.  G. SPIESS  1,725,837
CROSS FOLDING MACHINE
Filed Feb. 4, 1927  7 Sheets-Sheet 2

Inventor: Georg Spiess
By ........
Attorney

Aug. 27, 1929.    G. SPIESS    1,725,837
CROSS FOLDING MACHINE
Filed Feb. 4, 1927    7 Sheets-Sheet 3

Inventor: Georg Spiess

Aug. 27, 1929.    G. SPIESS    1,725,837
CROSS FOLDING MACHINE
Filed Feb. 4, 1927    7 Sheets-Sheet 4

Inventor: Georg Spiess

Inventor: Georg Spiess
By: Attorney

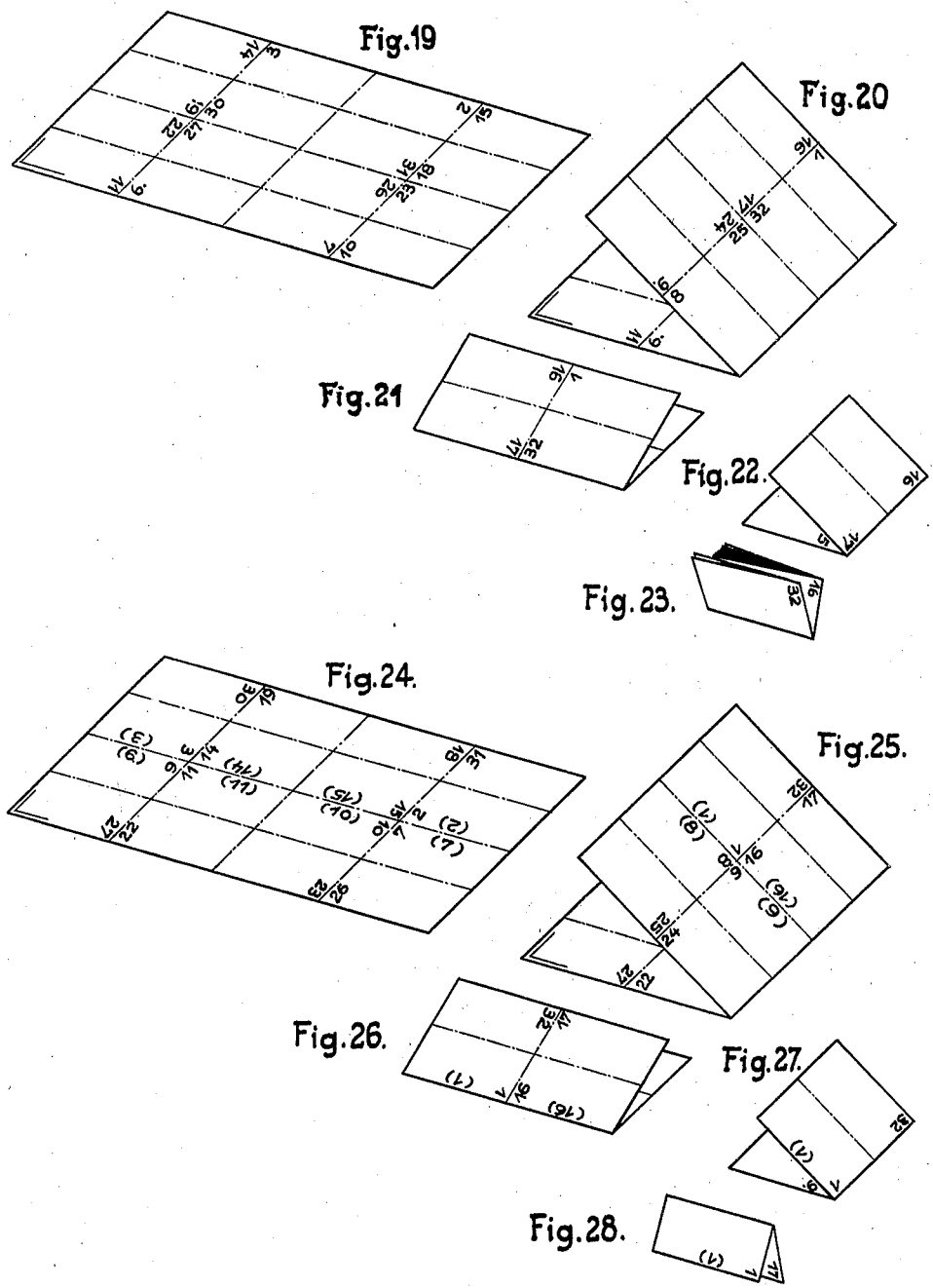

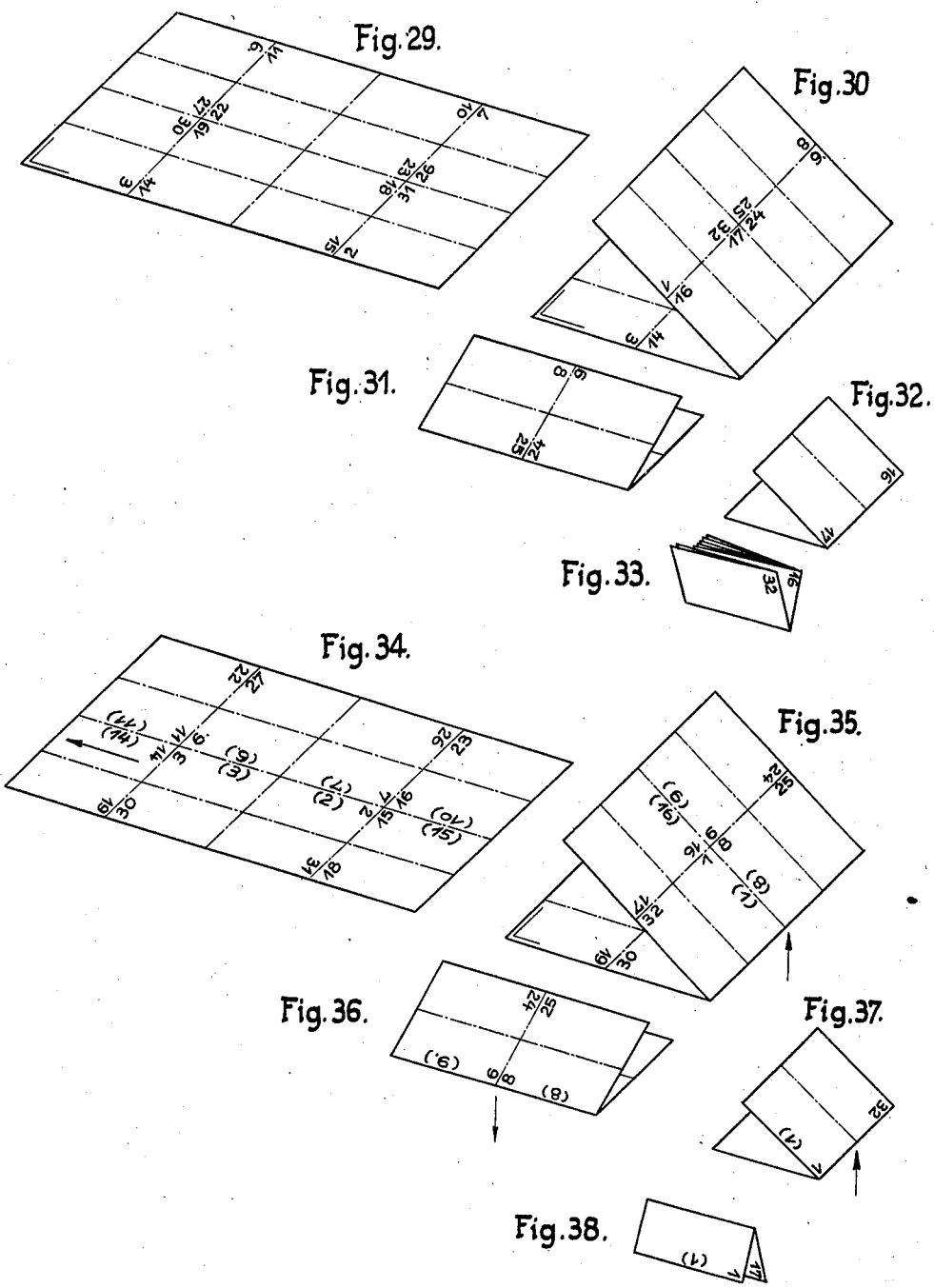

Patented Aug. 27, 1929.

1,725,837

UNITED STATES PATENT OFFICE.

GEORG SPIESS, OF LEIPZIG-PLAGWITZ, GERMANY.

CROSS-FOLDING MACHINE.

Application filed February 4, 1927, Serial No. 165,883, and in Germany February 4, 1926.

For exact register of the printed pages on a folded sheet it is necessary that the same edges of the sheet be used for obtaining the register when printing and when folding. In view of the interdependence of the printing and folding operations the printing and bookbinding trades have developed and adopted certain standard methods of superimposing and folding, which when used in conjunction result in placing the pages in the proper order and register when the sheet is folded. With plain cross-folding the first and second folds are always made in the same way, but the third is sometimes made in one direction, and sometimes in another, according to the lay-out adopted, which may be either "book" or "newspaper". With four cross folds the fourth is sometimes made in continuation of a three-fold "book", and sometimes in continuation of a three-fold "newspaper" fold.

A machine which is to meet all the requirements met in practice, that is to say is to be able to effect all kinds of cross-folding, must therefore be able to make the third fold either as a "book" fold or as a "newspaper" fold. A machine for making four cross folds must, moreover, be able to make the fourth fold in continuation of a third "newspaper" fold or a third "book" fold, and preferably so that the fourth fold is either a "book" fold or a "newspaper" fold; that is to say there are four possibilities in respect of the fourth fold.

The object of the invention is to provide for these variations of cross-folding in connection with a folding machine of the kind in which the sheet is folded by checking it at its leading edge, and continuing to push it from behind, so that it is buckled and gripped by folding rollers, which fold it and feed it on. The invention is concerned in particular with a device and arrangement whereby in plain cross-folding the third fold can be made either as a "book" fold or as a "newspaper" fold, and in making four folds the fourth may follow a third "book" or "newspaper" fold, and may itself be either a "book" or a "newspaper" fold.

For this purpose, for plain cross-folding, the third folder, usually consisting of two folding rollers, a driving roller, and a sheet guiding and checking device, referred to for brevity as a folding plate, is provided with a fourth roller and a second folding plate, or instead of using this second folding plate the original folding plate may be made transferable, the folder being thus converted into a double folder, and being provided with a deflector which can be so adjusted in relation to the two pairs of folding rollers that the sheet may pass through either the first pair or the second pair without being folded. In the case of a machine for making four folds the fourth folder is similarly constructed. The invention also provides that sheets with three or four cross folds, and possibly also parallel folds, are all laid and stacked upon a common receiving track. The invention also includes an arrangement enabling the sheet to be given several parallel folds in succession before proceeding to the next cross fold.

The invention is illustrated in the drawings, showing examples thereof.

Figure 1:
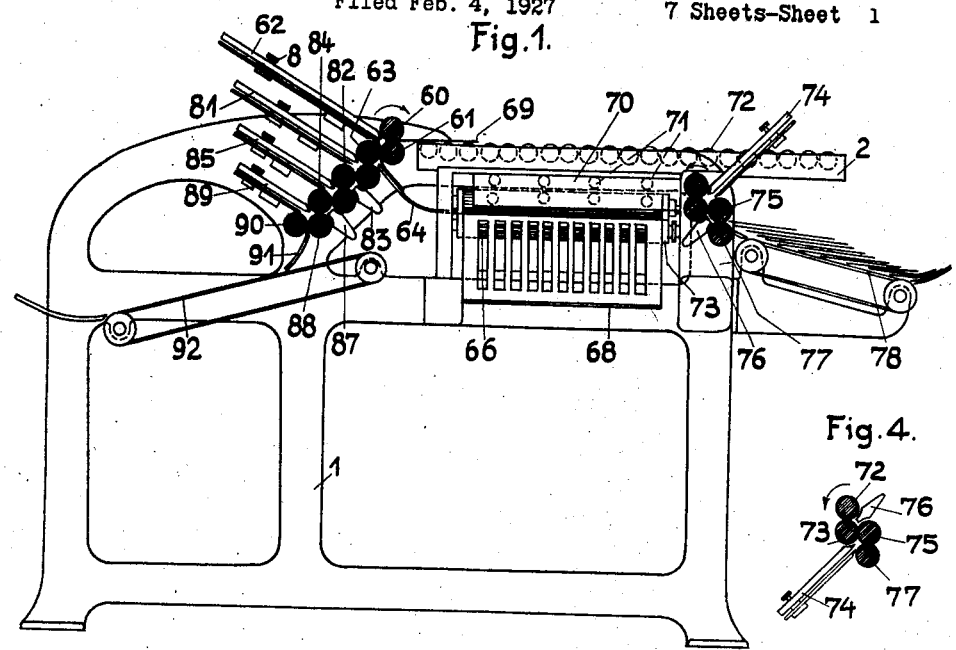
Figs. 1 to 3 show a combined parallel and three-fold cross-folding machine adjusted for plain cross folding, with the third fold as a "newspaper" fold, the views being a side view, plan view, and end view from the feeding-in side.
Figure 5:
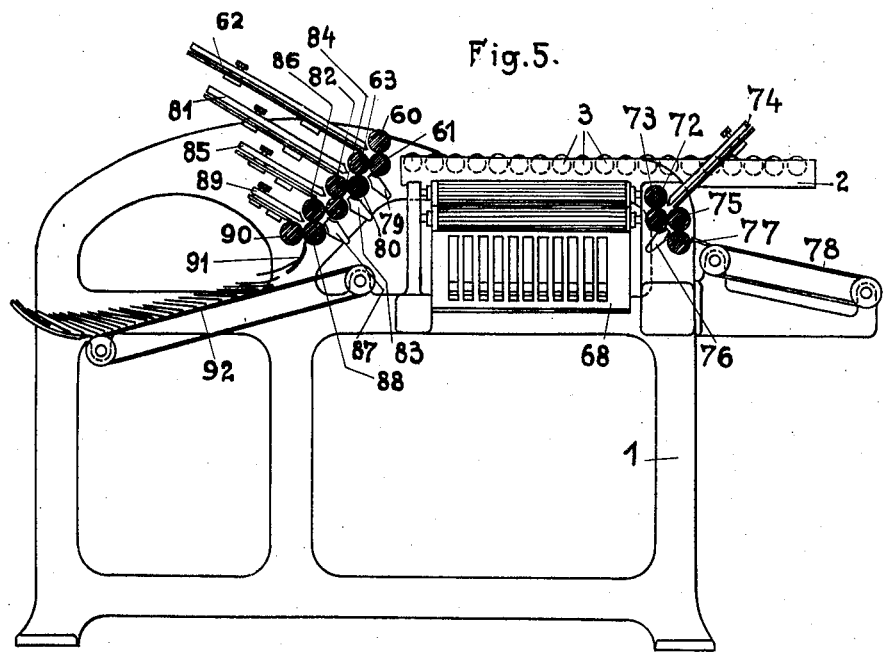

Fig. 5 corresponds with Fig. 1 but with the adjustment for plain parallel folding.

Figure 6:
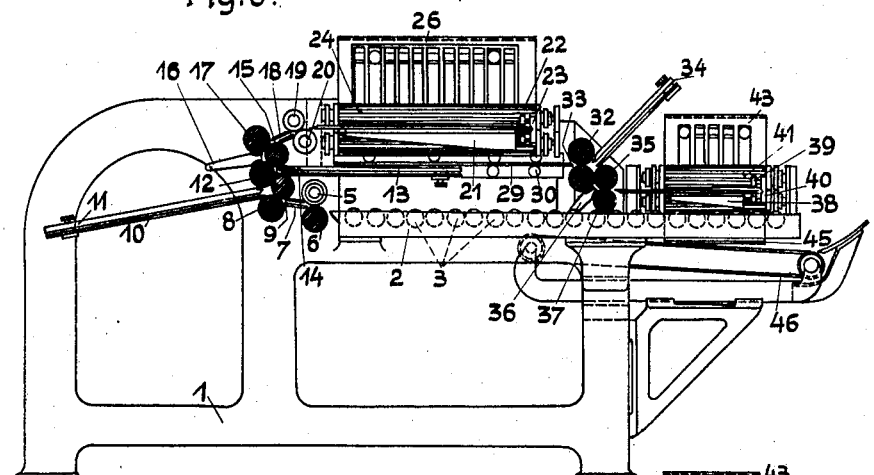
Figure 7:
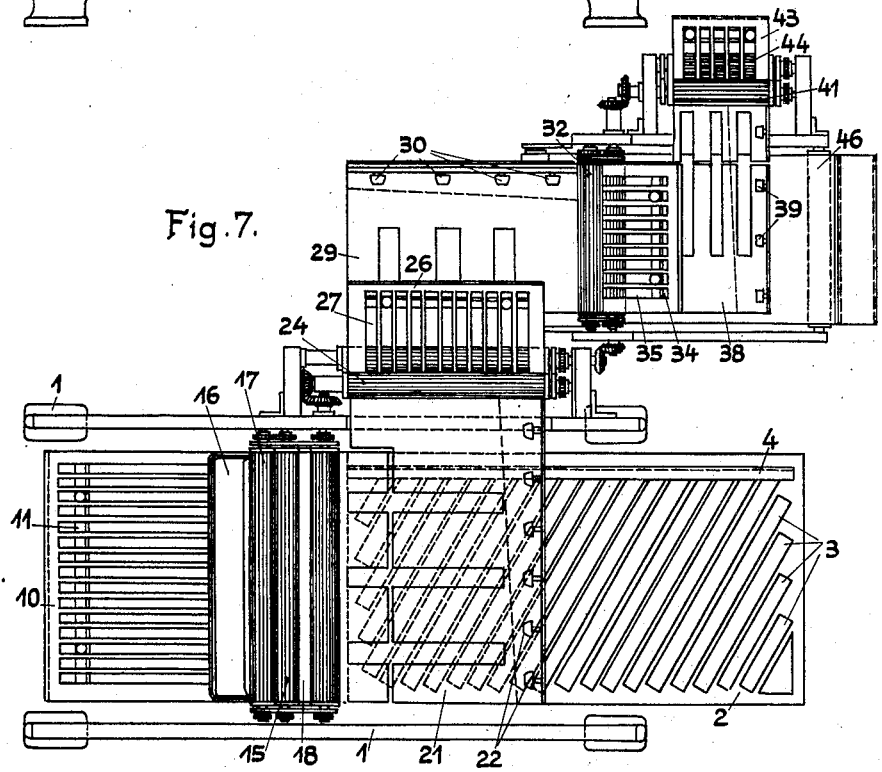
Figure 8:
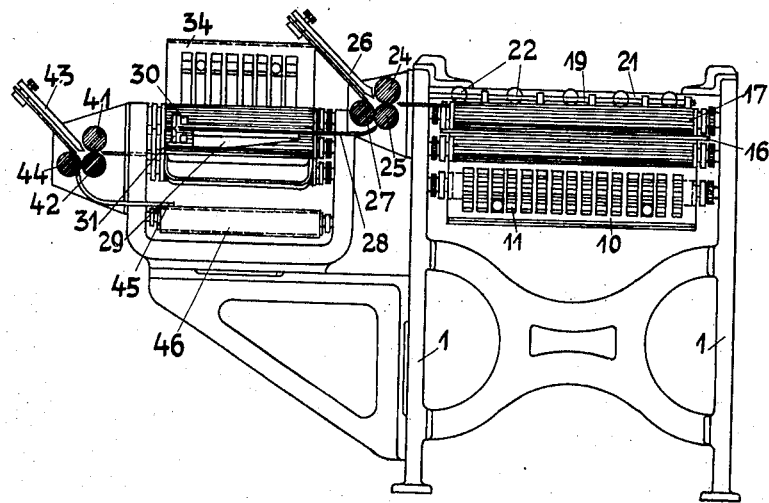

Figs. 6 to 8 show a combined parallel and four-fold cross-folding machine adjusted for producing a second fold parallel to the first and three subsequent folds as cross-folds, in side elevation, plan and an end elevation from the rear. In this example, as opposed to the previous constructions, the cross-folding devices are arranged on the right of the feed table. The cross-folder forming the second cross-fold, that is, the folder forming the third fold when plain cross-folding is performed, is here adjusted for three-fold work.

Figure 9:
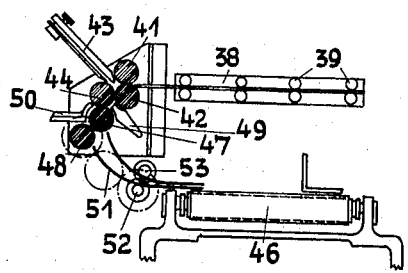
Figure 10:
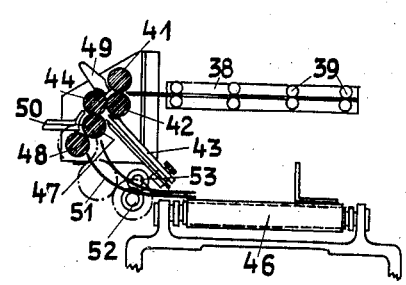
Figure 11:
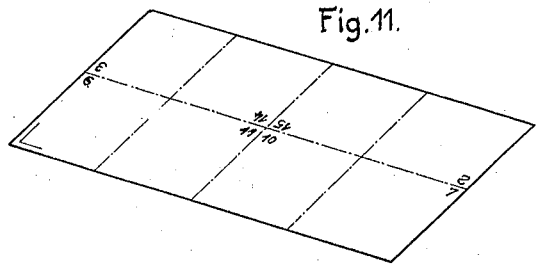

Figs. 9 and 10 illustrate in the same elevation the arrangement of the fifth folder when parallel folding is dispensed with, thus the fourth folder is arranged as a double folder, being adjustable for interchangeable folding for "book" and "newspaper" folds.

Figs. 11 to 38 show in diagrammatic form the stages of folding for the various methods of folding the sheet before folding and after each fold has been made.

In particular—

Figs. 11 to 14 show the folding procedure according to usual three "book" folds.

Figs. 15 to 18 show the usual three "newspaper" folds.

Figs. 19 to 28 show a four-fold "book" sheet with the fourth fold made in one direction (Figs. 19 to 23) and in the other direction (Figs. 24 to 28).

Figs. 29 to 38 show a four-fold "newspaper" sheet with the fourth fold made in one direction (Figs. 29 to 33) and in the other direction (Figs. 34 to 38).

In Figures 1 to 5, 1 denotes the machine frame, 2 the feed table on which the sheets are laterally fed by inclined rollers 3 against a rule 4 attached to the table and then forward between the rollers 60, 61, which feed the front part of the sheet into a sheet guide 62. Upon checking the sheet by impact of its front edge against a stop 8 in the folding plate, the sheet is creased in the folding position and gripped by the folding rollers 61, 63 by virtue of the feeding action of the driving rollers 60, 61. For plain cross-folding (Figs. 1 to 4) the folded sheet is led rearwards as it leaves the rollers 61 and 63 by a removable deflector 64 disposed below the folding rollers 61, 63 to a deflecting guide below the feed table 2, in which guide the sheet is gripped at its folded edge by inclined rolls 65 arranged in pairs and fed to the left at right angles to its former direction of travel against a rule into the laterally disposed second folder, consisting of the pair of feed rollers 66, 67, the folding plate 68 and the pair of folding rollers 67, 69. The twice folded sheet passing upwardly out of the pair of folding rollers is directed by a deflector into the outwardly closed deflecting guide 70 and fed by the inclined rolls 71 at right angles to its former direction of travel and placed opposite to the entrance of the third folder, which consists of the pair of feed rollers 72, 73, the folding plate 74, the pair of folding rollers 73, 75, the deflector 76 and the second pair of folding rollers 75, 77. The folding plate 74 and the deflector are oppositely interchangeable.

Figure 4:
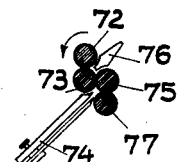
Fig. 4 shows the arrangement of the third folder when adjusted for "book" folding.
Figure 2:
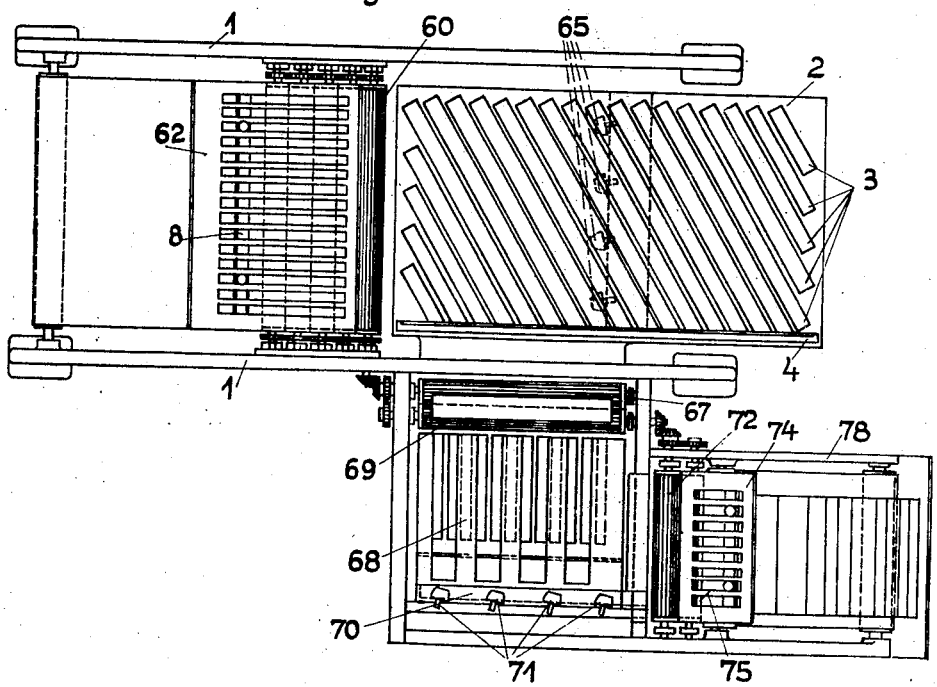
Figure 3:
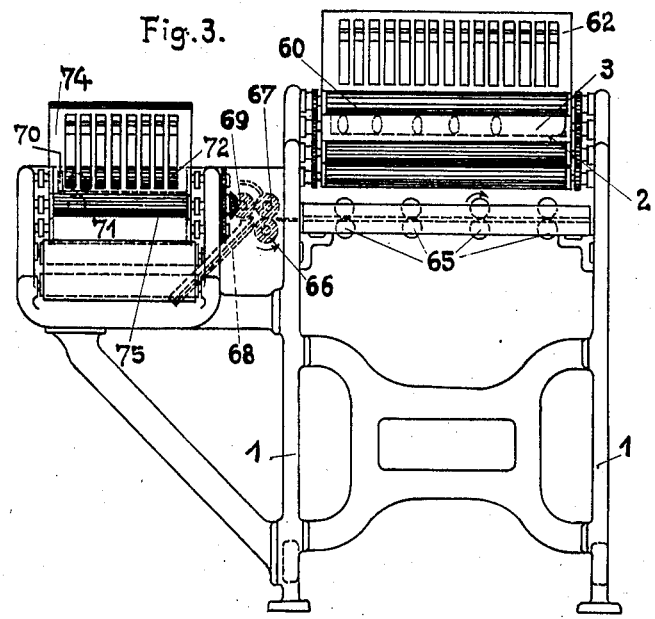

When adjusted as shown in Figs. 1 to 3 with the folding plate 74 above and the deflector 76 below the pair of folding rollers 73, 75, the sheet is downwardly bent in the third folder and folded by the folding rollers 73, 75, whilst the rollers 75, 77 act only as feed rollers and lay the sheet on a collecting track 78, which is attached to the third folder in opposite direction to the travel of the sheets. If the third fold is not to be made in this way, which is called a "newspaper" fold, but is to be made in the opposite direction as a "book" fold, the folding plate 74 and the deflector 76 have to be interchanged so that the deflector is disposed above and the folding plate below the pair of folding rollers 73, 75. In this position the rollers 73, 75 act purely as feed rollers and the sheet is bent in opposite direction and folded and delivered by the folding rollers 75, 77. Fig. 4 shows this arrangement of the third folder.

A number of additional rollers are arranged connecting with the pair of folding rollers 61, 63 of the first folder parallel with them, but disposed stepwise, so that pairs formed of rollers lying side by side constitute pairs of folding rollers and pairs formed of superposed rollers act as feed rollers for the next folding plate. The folding plates are all arranged one over the other in the same direction, each being disposed over a pair of folding rollers. Deflectors are used for directing the sheets issuing from one pair of folding rollers into the next pair of feed rollers.

To change over the machine for parallel folding (Fig. 5) it is only necessary to remove the deflecting plate 64 and replace it by a deflector 79. The sheet as it issues from the pair of folding rollers 61, 63, is directed by this deflector into the pair of feed rollers 63, 80 which forward it into the folding plate 81 and bend it so that it is gripped by the folding rollers 80, 82. The deflector 83 directs the sheet into the pair of feed rollers 82, 84 which feed the sheet into the folding plate 85 and so bend it that it is gripped by the folding rollers 84, 86. Lastly the deflector 87 brings the sheet between the feed rollers 86, 88, which forward it into the folding plate 89 and the pair of folding rollers 88, 90. The parallel folded sheet issuing from the last pair of folding rollers passes over the deflector plate 91 on to the delivery band 92, which is disposed below the parallel folding device as a continuation of the feed table 2.

In the folding machine illustrated in Figs. 6 to 8, for making four folds across one another, the angular conveyor, which feeds the sheet having one or more folds, is located above the feed table. This has the advantage that the adjusting device on this angular conveyor is less difficult of access and the feed table can be arranged lower down. The latter has also the advantage that by combining the machine with a mechanical sheet stacker the height of the structure can be lessened, which is of special importance when a circular stacker is used. In the machine illustrated the cross-folders are built laterally and to the right on the main frame of the machine, and the aligning stop 4 is correspondingly located on the right hand side of the feed table, thus the aligning edge of the sheet is used also as an aligning edge after the first cross-fold. The sheet forwarded along the rule 4 by the feed rollers of the feed-table is fed by a pair of rollers 5, 6 over the guide 7 to a pair of feed rollers 8, 9, which feed the front part of the sheet into a folding plate 10. Upon checking the sheet by impact of its front edge against a stop 11 provided in the folding plate, the sheet is bent at the folding position by the pushing action of the pair of feed rollers 8, 9 and gripped by the folding rollers 9, 12. A folding plate 13 is disposed above the folding roller 9 and directed rearwardly, on which a deflector 14 is arranged for plain cross-folding, which directs the sheet issuing from the pair of folding rollers 9, 12 between the pair of rollers 12, 15. The sheet passing between these rollers is directed by a guide 16 between the pair of rollers 15, 17, and on issuing from this pair passes through a guide 18 and a pair of feed rollers 19, 20 into a sheet guide 21 disposed above the feed table 2 and connecting rearwardly therewith and constructed as a conveyor. The sheet is forwarded into this oppositely to its direction of travel into the machine until it is gripped at its folded edge by the conical rolls 22 disposed in pairs and led along a rule 23 at right angles to its former direction of travel to a cross-folder which is arranged at right angles to the previously mentioned folding rollers on the right hand side of the machine. This folder consists of the feed rollers 24, 25, the outwardly directed folding plate 26 and the roller 27 located below this, which roller together with the roller 25 constitute the pair of folding rollers. Upon issuing from the latter the sheet is led by a deflecting plate 28 into a sheet guide 29 constructed as an angular conveyor, until it is gripped by the inclined rolls 30 and led along a rule 31 to the subsequent folder which performs the second cross-fold, that is the third fold in plain cross-folding. This folder, consisting of the rollers 32, 33, 35, 37 the folding plate 34 and the deflector 36 is adjustable in the same manner as the folders 72 to 77 of the previously described construction, i. e. it can be adjusted for bending and creasing the sheet in both directions.

The pair of rollers 36, 37 forward the folded sheet into an angular conveying guide 38 in which the inclined roller 39 guide the sheet along the rule 40 to a folder arranged at a right angle to the folder 32 to 37. This consists of the feed rollers 41, 42, the folding plate 43 and the roller 44 forming with the roller 42 a pair of folding rollers.

Upon issuing from the pair of rollers 42, 44 the sheet passes by way of the guide 45 to the stack on the receiving track 46, which is located below the angular conveying guide 29 of the folding device 32 to 37 and the angular conveyor 38, parallel to the feed table, and which stacks the folded sheets in opposite direction to the direction of input. With this arrangement the sheets issuing from the folder 32 to 37 may be immediately stacked, if the sheets as they issue be directed to the stack by an arrangement of deflectors instead of passing into the angular conveying guide 39, or if, by making the fourth folder swingable together with the angular conveyor 38, the whole of the last folding device is brought into a position in which it is inoperative.

The last folder 41 to 44 can be adjusted for creasing in opposite directions in the same manner as the folder 32 to 37. Figs. 9 and 10 disclose this arrangement. With this arrangement of the folder two further rollers 47, 48 are joined on to the rollers 42, 44. With the adjustment for folding shown in Fig. 8 the sheet is directed by a deflector 49 located between the rollers 42, 47 and below the rollers 44, and by a deflector 50 between rollers 47, 48. The sheet issuing from this pair of rollers is fed on to the conveyor track 46 by a guide 51 and a pair of feeding rollers 52, 53. When adjusted for oppositely creasing and folding the sheet (Fig. 10) the deflector 49 and the folding plate 43 are changed over, so that the sheet passes through the pair of rollers 44, 42 unfolded and the folding occurs first between the rollers 44, 47.

The folding system 8 to 17 can also be used for producing a fold parallel to the first fold before commencing the cross-folding. For this purpose the deflector 14 is merely removed from the folding plate 13 so that the end folded sheet enters the folding plate 13 by its folded edge and is bent by the folding rollers 12, 15. The parallel folding system can be extended as desired by increasing the rollers and folding plates.

The machine illustrated in Figs. 6 to 8 can be constructed with the cross-folders arranged on the left-hand side. In this case the aligning rule 4 is brought to the left hand side of the feed table 2 and a deflector is inserted in the folding plate 10 so that the first fold is made by the folding plate 13 and the pair of rollers 12, 15.

Figure 12:
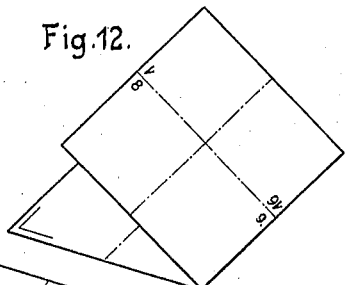
Figure 13:
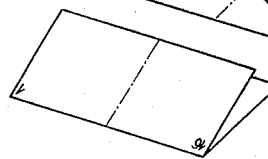
Figure 14:
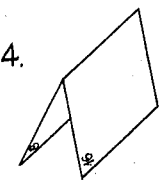
Figure 15:
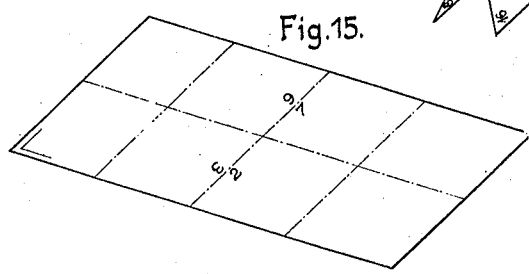
Figure 16:
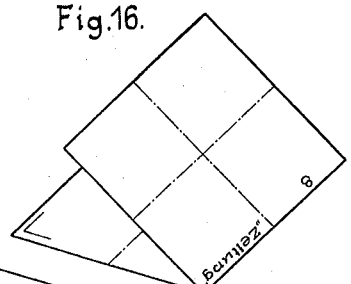
Figure 17:
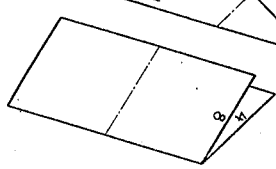
Figure 18:

Figs. 11 to 14, inclusive, show the method of folding a sixteen page printed "book" sheet, and Figs. 15 to 18, inclusive, the method of folding a thrice-folded sheet as a "newspaper" fold, while Figs. 19 to 23, inclusive, 24 to 28, inclusive, 29 to 33, inclusive, and 34 to 38, inclusive, show different methods of folding a sheet with four folds. In all these methods of folding the first fold in each case is made in the same direction, and the same is true with respect to the second fold, while the third and fourth folds may be variable, i. e., made in one direction or the other. In folding the sixteen page "book" sheet shown in Figs. 11 to 14, inclusive, the rear (right hand) half of the sheet (Fig. 11) is folded on the central transverse line of the sheet over upon the forward (left hand) half of the sheet as shown in Fig. 12 to produce the first fold, the once-folded sheet is then folded on its central longitudinal line so as to turn the lower half (Fig. 12) of the so-folded sheet downwardly and beneath the upper half of said sheet, thus producing the twice-folded sheet shown in Fig. 13, and finally the left half of the twice folded sheet shown in Fig. 13 is turned down on the central transverse line of the sheet under the left half of the sheet, thus producing the thrice-folded sheet shown in Fig. 14. In folding the eight page "newspaper" sheet shown in Figs. 15 to 18, inclusive, which differs from the sheet shown in Figs. 11 to 14, inclusive, only in the number arrangement of the pages, the mode of making the first and second folds (Figs. 16 and 17) is the same as in Figs. 12 and 13, while the third fold (Fig. 18) is made by turning the right half of the twice folded sheet (Fig. 17) on the central transverse line over upon the left hand of the sheet. The manner in which the sheet is produced in Fig. 18 does not admit of the pages being successively turned, but this may be done when the sheet is cut at its upper edges between the leaves 1 and 2 and 3 and 4 and between the leaves five and six and seven and eight. Figs. 19-23, 24-28, 29-33 and 34-38, show modes of producing a four-fold, 32 page sheet. The mode of producing the first two folds, that is, the folding direction of these two folds, is the same as in Figs. 12 and 13 and Figs. 16 and 17, but the mode of producing the third fold, that is, the direction of this fold, whether corresponding to Fig. 14 or to Fig. 18 varies and the mode of producing the fourth fold, with regard to direction, similarly varies, according to the page numbering employed, whether for book or newspaper purposes.

Thus for producing four folds the printed sheet may be turned out in different ways the one corresponding to Figs. 24 to 28 and the other to Figs. 34 to 38, the page numbers of this sheet are given once for the usual "book" printing (open numerals) and also for the "newspaper" folding (bracketed numerals). When this method of folding is used for newspapers a sixteen-page newspaper results. The statement already made in connection with Figs. 15 to 18 (thrice-folded newspaper) is also applicable here in so far as an easily turning over of the leaves of this newspaper is not at once possible, but the closed edges must be opened, and as four folds are dealt with here the narrow upper edges mut be opened and the longer edges at pages 9/10 and 11/12 on the one hand and 13/14 and 15/16 on the other hand.

Having thus fully described my invention, I claim:

1. In a folding machine, the combination with primary and secondary folders for twice folding a sheet of a third folder, and means for causing the third folder to fold the sheet in one direction or the other of two cross-folding directions.

2. In a folding machine, the combination with primary and secondary folders for twice folding a sheet in the same direction, of a third folder for folding the sheet in either one of two directions at right angles to the first-named direction, and means for causing said cross folder to fold the sheet in one or the other of the second-named directions.

3. In a folding machine, the combination with primary and secondary folders for twice folding a sheet, of a third folder, means for governing the action of the third folder for cross-folding the sheet in either one of two directions, a fourth folder, and means for governing the fourth folder to cause the same to fold the sheet in the same direction as the third folder or in the opposite direction.

4. In a folding machine, the combination with primary and secondary folders for twice folding a sheet in the same direction, of a third folder having a pair of folding units for cross-folding the sheet in one direction or the other, and means for directing the sheet toward either unit of the third folder.

5. In a folding machine, the combination with primary and secondary folders for twice folding a sheet in the same direction, of a third folder having folding elements for cross-folding the sheet in either one of two directions, and guiding means changeable as to position to direct the sheet to the folding elements so as to be folded in either one of the two directions.

6. A folding machine comprising a primary folder, a series of parallel folders, a series of folders for producing right angular buckling folders, and interchangeable deflectors for directing the sheet from the primary folder toward the parallel folders or toward the right angular buckling folders.

7. A folding machine of the character set forth in claim 1, wherein a feed table is provided for feeding the sheets to the first folder and a conveyor is provided for conducting the sheets from the first folder to the second folder, said conveyor being arranged in a plane passing vertically through the feed table.

In testimony whereof I affix my signature.

GEORG SPIESS.